(12) United States Patent
Huang (10) Patent No.: US 9,869,873 B2
(45) Date of Patent: Jan. 16, 2018

(54) STEREO DISPLAY DEVICE

(71) Applicant: DELTA ELECTRONICS, INC., Taoyuan (TW)

(72) Inventor: June-Jei Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 75 days.

(21) Appl. No.: 15/210,909

(22) Filed: Jul. 15, 2016

(65) Prior Publication Data

US 2017/0285356 A1 Oct. 5, 2017

(30) Foreign Application Priority Data

Mar. 31, 2016 (TW) .............................. 105110196 A (51) Int. Cl.
| | |
|---|---|
| G02B 27/22 | (2006.01) |
| G03B 21/606 | (2014.01) |
| G02B 3/00 | (2006.01) |
| G02B 3/08 | (2006.01) |
| G03B 21/625 | (2014.01) |
| H04N 13/04 | (2006.01) |

(52) U.S. Cl.
CPC ....... G02B 27/2214 (2013.01); G02B 3/0068 (2013.01); G02B 3/08 (2013.01); G03B 21/606 (2013.01); G03B 21/625 (2013.01); H04N 13/0402 (2013.01)

(58) Field of Classification Search
CPC ............ G01S 7/52068; G02B 27/2214; G02B 27/225; H04N 13/0402; H04N 13/0404; H04N 13/0422; G03B 21/606
See application file for complete search history.

(56) References Cited

U.S. PATENT DOCUMENTS

| | | | | |
|---|---|---|---|---|
| 5,392,140 A | * | 2/1995 | Ezra ................... | G02B 27/2214 348/E13.029 |
| 6,481,849 B2 | * | 11/2002 | Martin ............... | G02B 27/2214 348/52 |
| 2012/0127571 A1 | * | 5/2012 | Kanzaki ............. | G02B 27/2214 359/463 |
| 2012/0139897 A1 | | 6/2012 | Butler et al. | |
| 2017/0257622 A1 | * | 9/2017 | Seifert ............... | H04N 13/0413 |
| 2017/0289530 A1 | * | 10/2017 | Smithwick ......... | H04N 13/0404 |

FOREIGN PATENT DOCUMENTS

| | | |
|---|---|---|
| CN | 101978306 A | 2/2011 |
| TW | 201531791 A | 8/2015 |

OTHER PUBLICATIONS

Shunsuke Yoshida et al., "Implementation of a Tabletop 3D Display Based on Light Field Reproduction", SIGGRAPH 2010, Los Angeles, California, Jul. 25 -29, 2010.

(Continued)

*Primary Examiner* — William C Dowling
(74) *Attorney, Agent, or Firm* — CKC & Partners Co., Ltd.

(57) ABSTRACT

A stereo display device includes plural projectors, a lens array, and a concave axicon lens array. The projectors project images to plural viewing regions at an image side. The lens array is disposed between the projectors and the image side. The concave axicon lens array is disposed between the lens array and the image side.

15 Claims, 7 Drawing Sheets

(56) References Cited

OTHER PUBLICATIONS

Yoshida Shunsuke, et al., "3-6 fVisiOn: Glasses-Free Tabletop 3D Display Observed from Surrounding Viewpoint of 360°", Journal of the National Institute of Information and communications Technology. vol. 57 Nos. 1/2 2010,73-82.
Ping-Yen Chou et al., "A Horizontal Parallax Light Field 3D Floating Image Display System", the conference of International Display Manufacting conference & 3D systems and Applications 2015, TWTC Nangang, Taiwan, Aug. 25-28, 2015. Proc. 3DSA-2015, S4-5.

\* cited by examiner

STEREO DISPLAY DEVICE

RELATED APPLICATIONS

This application claims priority to Taiwan Application Serial Number 105110196, filed Mar. 31, 2016, which is herein incorporated by reference.

BACKGROUND

Field of Invention

The present invention relates to a stereo display device.

Description of Related Art

As the development of electronic technologies, people have been hardly satisfied with plane display devices, such that stereo display devices are born accordingly to provide immersive experiences. Stereo display devices may be implemented with or without glasses. With the glasses-less stereo display technologies, it is more conformable for observers for not necessarily wearing corresponding equipments in observations. As a result, the glasses-less stereo display technologies are more popular than the glasses-type stereo display technologies.

SUMMARY

The embodiments of the present invention provide a stereo display device. Through the configuration of the concave axicon lens array, images are projected to plural viewing regions. For the viewing regions, the concave axicon lens array can provide a lens power in a horizontal direction and a diffusing effect in a vertical direction.

According to one aspect of this invention, a stereo display device including plural projectors, a lens array, and a concave axicon lens array is provided. The projectors project images to plural viewing regions at an image side. The lens array is disposed between the projectors and the image side. The concave axicon lens array is disposed between the lens array and the image side.

In some embodiments of the present invention, the stereo display device further includes a substrate disposed between the lens array and the concave axicon lens array, and the lens array and the concave axicon lens array are directly disposed on two opposite surfaces of the substrate respectively.

In some embodiments of the present invention, the lens array comprises plural lenses, the concave axicon lens array comprises plural axicon lenses, and a center of each of the lenses is substantially aligned with a center of each of the axicon lenses.

In some embodiments of the present invention, each of the axicon lenses includes a plane surface and a concave conical surface. The plane surface is proximate to the lens array. The concave conical surface is disposed opposite to the plane surface.

In some embodiments of the present invention, the lens array includes a first lenticular lens and a second lenticular lens, and an extension direction of the first lenticular lens is substantially perpendicular to an extension direction of the second lenticular lens.

In some embodiments of the present invention, the stereo display device further includes a substrate disposed between the first lenticular lens and the concave axicon lens array, in which the first lenticular lens and the concave axicon lens array are directly disposed on two opposite surfaces of the substrate respectively.

In some embodiments of the present invention, a projection of the first lenticular lens and a projection of the second lenticular lens on a plane where the concave axicon lens array located form plural intersection positions, the concave axicon lens array includes plural axicon lenses, and a center of each of the axicon lenses is substantially aligned with a center of each of the intersection positions.

In some embodiments of the present invention, the stereo display device further includes a substrate disposed between the lens array and the concave axicon lens array, wherein the concave axicon lens array comprises a plurality of axicon lenses, and the axicon lenses are disposed on the substrate uniformly.

In some embodiments of the present invention, the lens array is confocal with the concave axicon lens array.

In some embodiments of the present invention, the lens array includes at least one lens, the concave axicon lens array includes at least one axicon lens, and a focal point of the lens is substantially located on a focal line of the axicon lens.

In some embodiments of the present invention, a focal length of the lens array is greater than a focal length of the concave axicon lens array.

In some embodiments of the present invention, the stereo display device further includes a first fresnel lens disposed between the projectors and the lens array.

In some embodiments of the present invention, the stereo display device further includes a second fresnel lens disposed at a side of the concave axicon lens array opposite to the lens array.

In some embodiments of the present invention, the projectors are arranged on a first plane, the lens array is disposed on a second plane, and the first plane is substantially parallel with the second plane.

In some embodiments of the present invention, the stereo display device further includes a table, wherein the projectors, the lens array, and the concave axicon lens array are disposed in the table, and the projectors are respectively configured to project the images to the viewing regions out of the table through a surface of the table.

It is to be understood that both the foregoing general description and the following detailed description are by examples, and are intended to provide further explanation of the invention as claimed.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
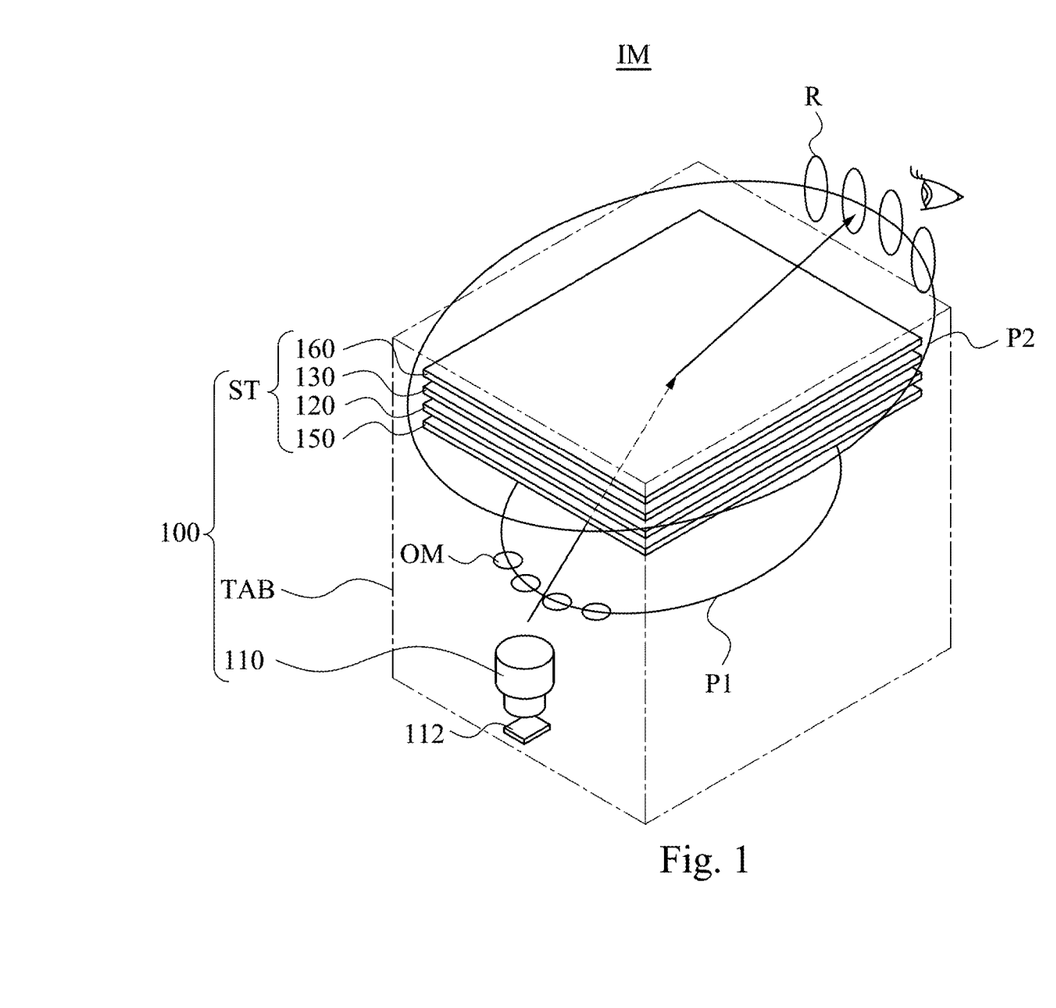
FIG. 1 is a stereoscopic view of a stereo display device according to an embodiment of this invention.
Figure 2:
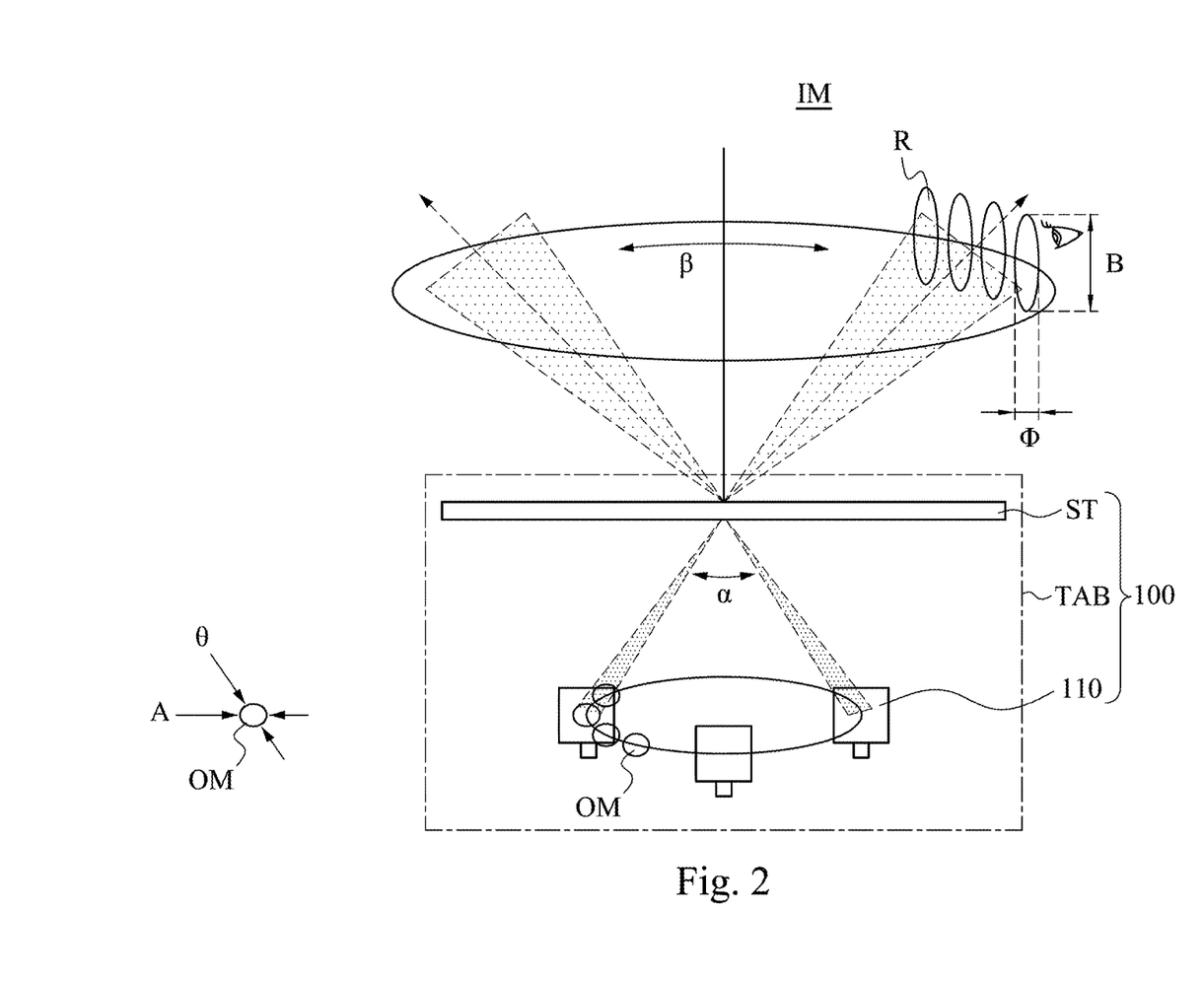
FIG. 2 is a side view of the stereo display device of FIG. 1.
Figure 3:
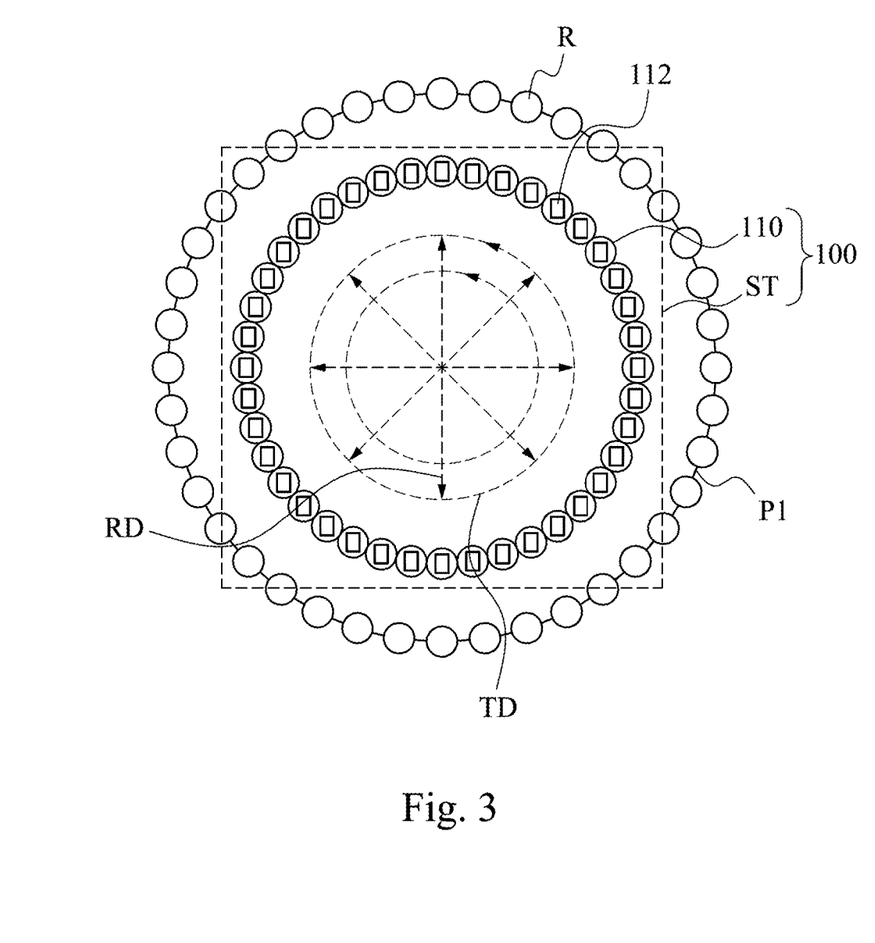
FIG. 3 is a top view of the stereo display device of FIG. 1.

FIG. 1 is a stereoscopic view of a stereo display device 100 according to an embodiment of this invention. FIG. 2 is a side view of the stereo display device 100 of FIG. 1. FIG. 3 is a top view of the stereo display device 100 of FIG. 1. The stereo display device 100 includes plural projectors 110 and a lens stack ST. Herein, the stereo display device 100 may be a tabletop display, providing stereo images that are capable of being observed by users through various angles. In other words, the stereo display device 100 may include a table TAB, the projectors 110 and the lens stack ST may be disposed in the table TAB, such that images OM are projected from a surface of table to viewing regions R out of the table TAB. Herein, the possible configurations of the table TAB are merely indicated by the dotted line, and it is noted that in actual applications, shapes of the table TAB are not limited to those shown in figures. Also, for ease of drawing, only one projector 110 is depicted in FIG. 1, and other projectors are omitted.

In the embodiments of the present invention, the plural projectors 110 respectively project the plural different images OM to the viewing regions R at an image side IM, and each of the projectors 110 is disposed corresponding the one of the viewing regions R. Herein, the viewing regions R are spaces at the image side IM that images OM are projected to, and users observe different images in different viewing regions R. In some embodiments, the plural viewing regions R may be distributed in a form of surrounding the surface of the table TAB, such that users may surround the table TAB and face toward the center of the surface of the table TAB for observations. As shown in figure, the projectors 110 are circularly arranged on a first plane P1, the viewing region R are circularly arranged on a second plane P2, and the first plane P1 is substantially parallel with the second plane P2. Through the configuration, the images OM circularly arranged may be projected to the second plane P2, and thereby form the viewing region R circularly arranged.

The lens stack ST includes a lens array 120 and a concave axicon lens array 130. The lens array 120 is disposed between the projectors 110 and the image side IM. The concave axicon lens array 130 is disposed between the lens array 120 and the image side IM. The plane where the lens stack ST is located is substantially parallel with the first plane P1 and the second plane P2. Therefore, the uniformity of lights projected into the lens stack ST (e. g. the images OM circularly arranged) is enhanced.

FIG. 2 is a side view of the stereo display device 100 of FIG. 1. Reference is made to both FIG. 1 and FIG. 2. The lights emitted from the projectors 110 to the lens stack ST have a range of angle, which is denoted as $\alpha$, and the lights emitted from the lens stack ST to the viewing regions R have a range of angle, which is denoted as $\beta$. An image horizontal width of the viewing regions R is denoted as $\Phi$, an image vertical height of the viewing regions R is denoted as B, a tangential width (i. e. a length in a tangent direction of a circular line where the projectors 110 are arranged) of the images OM is denoted as $\theta$, and a radial width (i. e. a length in a raidal direction of a circular line where the projectors 110 are arranged) of the images OM is denoted as A. Herein, an angular magnification $\beta/\alpha$, a horizontal magnification of images $\Phi/\theta$, and a vertical magnification of images B/A are related with characteristics of the lens array 120 and the concave axicon lens array 130 of the lens stack ST, and will be illustrated later in accompany with descriptions about the optical characteristics of the lens array 120 and the concave axicon lens array 130.

FIG. 3 is a top view of the stereo display device 100 of FIG. 1. Reference is made to both FIG. 1 and FIG. 3. Ideally, an area surrounded by the viewing regions R is greater than an area surrounded by the projectors 110, such that when users sit or stand around the table TAB, their eyes may be located in the viewing regions R. For ease of drawing, in FIG. 3, the lens stack ST is indicated with a dotted line. In addition, tangential directions TD and radial directions RD are designated for supporting the subsequent descriptions about the optical characteristics of the lens array 120 and the concave axicon lens array 130.

Figure 4:
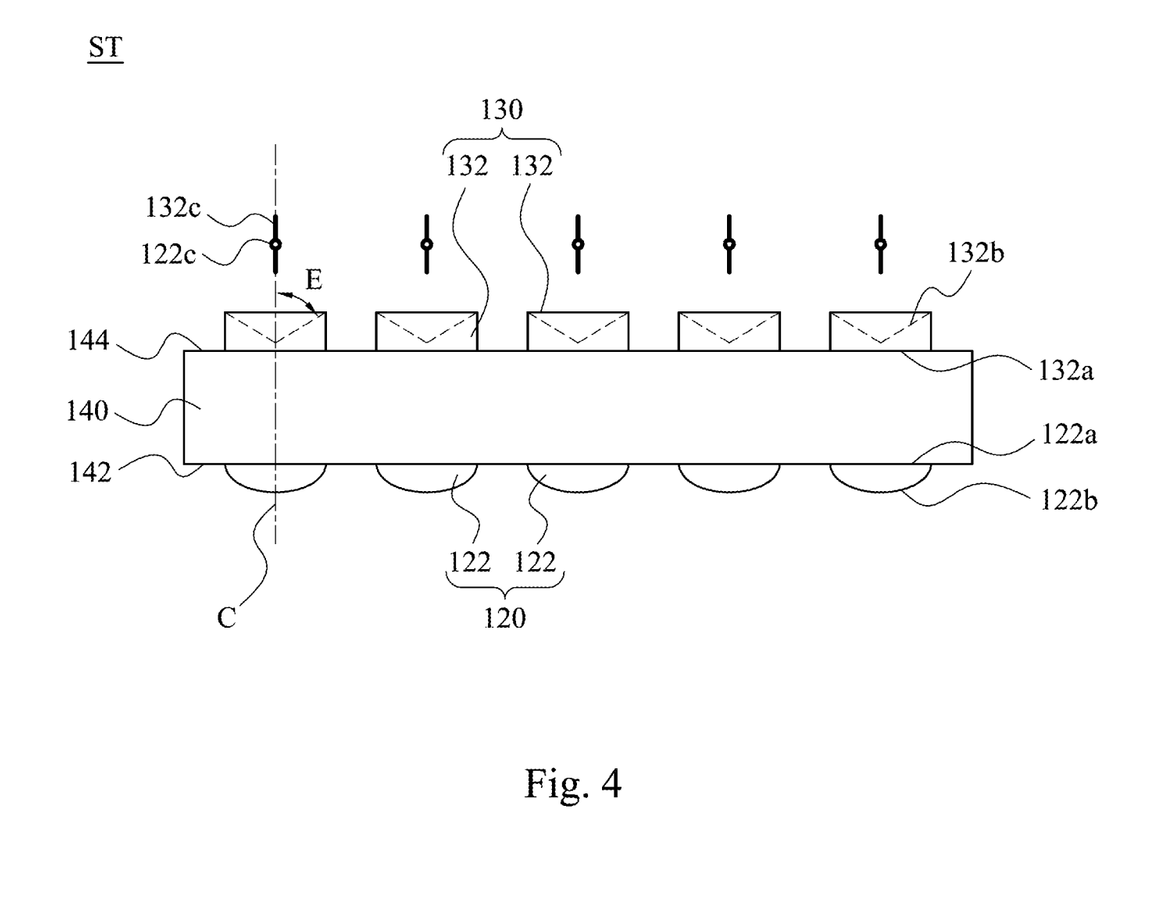
FIG. 4 is a side view of a portion of a lens stack of the stereo display device of FIG. 1.

FIG. 4 is a side view of a portion of the lens stack ST of the stereo display device 100 of FIG. 1. Herein, FIG. 4 shows the lens array 120 and the concave axicon lens array 130 of the lens stack ST of the stereo display device 100. The lens array 120 includes at least one lens 122, the concave axicon lens array 130 includes at least one axicon lens 132. In some embodiments of the present invention, a center of each of the axicon lenses 132 is substantially aligned with a center of each of the lenses 122, such that each of the axicon lenses 132 and each of the lenses 122 may be located on the same optic axis C. Through the configuration, the lights passing through the lenses 122 substantially passes through the axicon lenses 132, such that the lights may be affected by both the lenses 122 and the axicon lenses 132. In some other embodiments, the axicon lenses 132 may not be aligned with the lenses 122. Alternatively, it is not necessary to align the axicon lenses 132 with the lenses 122 in a one to one manner.

In the embodiments of the present invention, the lenses 122 have a first surface 122a and a second surface 122b opposite to the first surface 122a. Herein, the first surface 122a may be a plane surface, and the second surface 122b have a curvature on two dimensions orthogonal to the optic axis C. Of course, the configuration of the lenses 122 described above should not limit the scope of the present invention, and the lenses 122 may have any suitable structure which is capable of providing uniform lens power in two dimensions.

Figure 5:
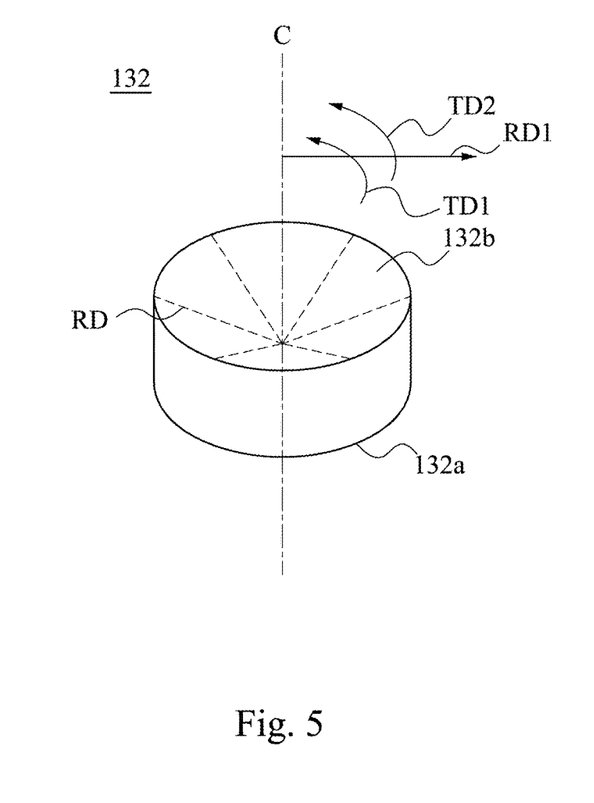
FIG. 5 is a stereoscopic view of an axicon lens of FIG. 4.

Reference is made both to FIG. 4 and FIG. 5. FIG. 5 is a stereoscopic view of one of the axicon lenses 132 of FIG. 4. At least one of the axicon lenses 132 includes a surface 132a and a concave conical surface 132b. The surface 132a is proximate to the lens array 120 and may be a plane surface. The concave conical surface 132b is disposed opposite to the surface 132a. Referring to FIG. 5, through the concave conical surface 132b, At least one of the axicon lenses 132 provides a lens power in the tangential directions TD1 and TD2 but provides outward deflection (such as a prism does) in the radial directions RD1. Herein, the optic axis C is the axial direction, the radial directions RD1 radiate out from the axial direction, and the tangential direction TD1 is orthogonal to the radial directions RD1. Each of the axicon lenses 132 has different tangential directions (such as the tangential directions TD1 and TD2) based different on heights, and each of the axicon lenses 132 provides different lens powers in different tangential directions. To be specific, in accordance with the plural tangential directions, each of the axicon lenses 132 has a focal line 132c (referring to FIG.

4), which is composed of plural focal points of the axicon lens 132. In the embodiments of the present invention, the focal point 122c of at least one of the lenses 122 is at least disposed on the focal line 132c of the corresponding one of the axicon lenses 132. Through the configuration, the lens power of at least one of the lenses 122 is matched with the lens power of at least one of the axicon lenses 132, and thereby achieving the function of the magnification of images (i.e. the distribution of the lights from projectors).

It is noted that the structure of the axicon lens 132 is not limited to those shown in figures. In fact, the axicon lens 132 may have any structure capable of achieving the above characteristics. For example, the surface 132a may be a concave conical surface, a convex conical surface, or a curved surface. In some embodiments of the present invention, the concave conical surface 132a and the optic axis C have an angle E therebetween, and the angle E is in a range from about 50 degrees to about 80 degrees.

Figure 6:
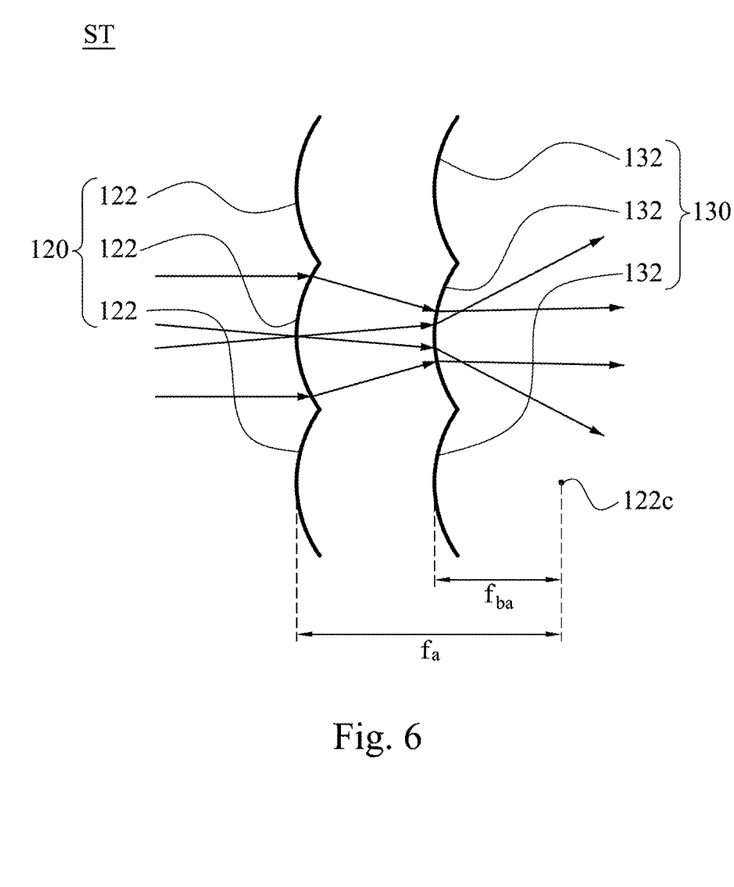
FIG. 6 is a schematic view of optical paths of the stereo display device of FIG. 3 in a tangential direction.
Figure 7:
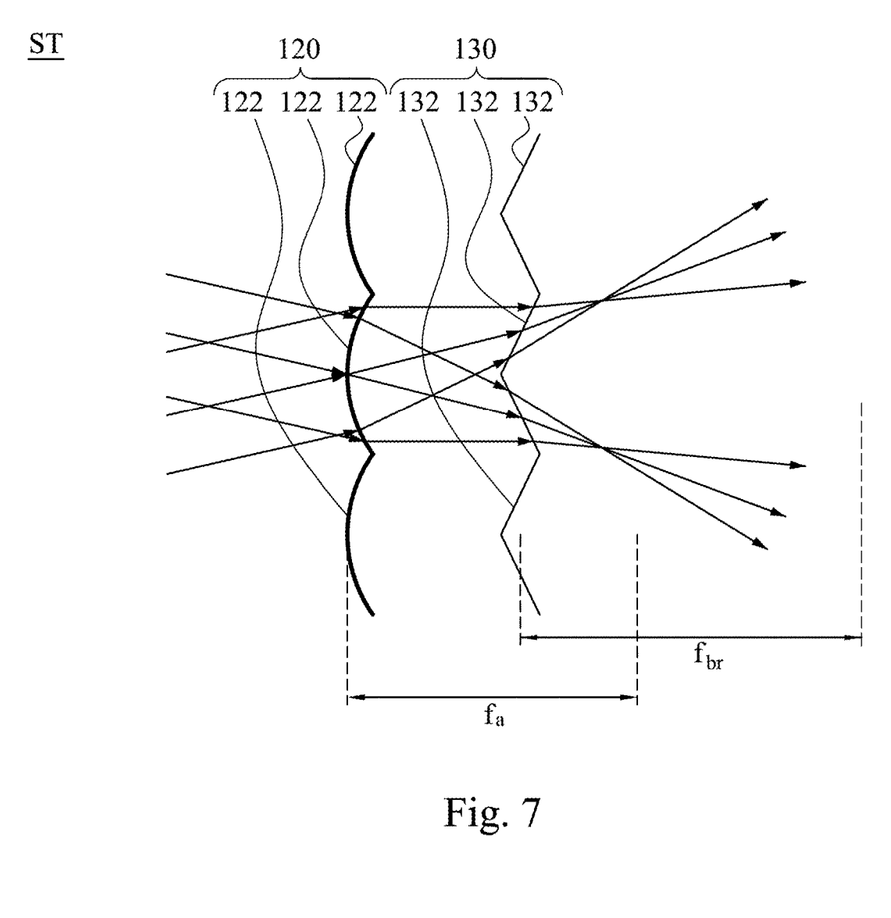
FIG. 7 is a schematic view of optical paths of the stereo display device of FIG. 3 in a radial direction.

Followings are detail descriptions about the optical characteristic of the lens array 120 and the concave axicon lens array 130. Reference is made to FIG. 3, FIG. 6, and FIG. 7. FIG. 6 is a schematic view of optical paths of the stereo display device 100 of FIG. 3 in the tangent direction TD. FIG. 7 is a schematic view of optical paths of the stereo display device 100 of FIG. 3 in a radial direction RD. In the embodiments of the present invention, if the lights are divided in to a portion distributed in radial directions RD and plural portions distributed in tangential directions TD, the lens power of the lens array 120 and the concave axicon lens array 130 may be discussed in tangential directions TD and radial directions RD. In FIG. 3, a vertical centerline of the first plane P1 is the axial direction, the radial directions RD radiate out from the axial direction, and the tangential directions TD are orthogonal to the radial directions RD. As previous illustration, the axicon lens 132 provides lens power in the tangential directions but provides outward deflection (such as a prism does) in the radial directions. Reference is made to FIG. 3, FIG. 6, and FIG. 7. The lens array 120 shows the same performance in the plural tangential directions TD and the radial directions RD, and the concave axicon lens array 130 shows different performance in the plural tangential directions TD and the radial directions RD.

Reference is made to FIG. 3, FIG. 4, and FIG. 7. For lights passing through the axicon lenses 132 in one of the tangential directions TD, each of the axicon lenses 132 may be considered as a concave lens, which provides a certain lens power to the lights. In some embodiments, the concave lens may be confocal with at least one of the lenses 122, thereby achieving the effect of the clear magnification of images (i.e. the distribution of the lights from projectors). In some embodiments of the present invention, a focal length fa of the lenses 122 is greater than a focal length fba of the concave lenses (axicon lenses 132), the horizontal magnification Φ/θ (referring to FIG. 2) of image (i.e. the distribution of the lights from projectors) is approximately fa/fba. The lens power of the axicon lenses 132 may calibrate the images in the viewing regions R in a horizontal direction. It is noted that in actual applications each of the axicon lens 132 has the focal line 132c in accordance with different tangential directions. In other embodiments, for other tangential directions TD, the concave lens (axicon lens 132) may not be confocal with the lens 122.

On the other hand, reference is made to FIG. 3, FIG. 4, and FIG. 7. For the lights in the radial directions RD, the axicon lenses 132 of the concave axicon lens array 130 may be considered as prisms, which provide deflection effect in radial directions RD. Since the focal length fbr of the prism is approximate infinite, there is no magnification of images (i.e. the distribution of the lights from projectors) in vertical direction. Referring to FIG. 2, B stands for the image height of the viewing regions R, A stands for the radial width of the images OM. For the viewing regions R, the prism deflection effect of the axicon lenses 132 provide an elevated angle for the users to overlook the surface of the table, and the images (i.e. the distribution of the lights from projectors) in the viewing regions R may be diffused in the vertical direction through the focal length fa of the lenses 120.

From above descriptions, in some embodiments, the concave axicon lens array 130 may provide a lens power in the horizontal direction and provides diffusing effect in the vertical direction.

In some embodiments, reference is made both to FIG. 1 and FIG. 4. The lens stack ST of the stereo display device 100 may further include a substrate 140. The substrate 140 is disposed between the lens array 120 and the concave axicon lens array 130. In some embodiments, the lens array 120 or the concave axicon lens array 130 may be formed by imprinting and solidifying gels on the substrate, such that the lens array 120 or the concave axicon lens array 130 may be directly disposed on surfaces 142 or 144 of the substrate 140. Furthermore, in some embodiments, the lens array 120 and the concave axicon lens array 130 may be directly disposed on the two opposite surfaces 142 and 144 of the substrate 140 respectively.

In some embodiments, the lenses 122 are disposed on the surface 142 of the substrate 140 uniformly, and the axicon lenses are disposed on the surface 144 of the substrate uniformly, such that most of the lights emitted from the projectors 110 may pass through both at least one of the lenses 122 and at least one of the axicon lenses 132 toward the viewing regions R.

In some embodiments, the substrate 140 may be used as a screen of the table, such that the concave axicon lens array 130 is disposed on the screen of the table, and the users may observe the concave axicon lens array 130 directly. It is noted that the substrate 140 is not a necessary configuration, in some embodiments, the configuration of the substrate 140 may be omitted, and the lens array 120 and the concave axicon lens array 130 act as individual structures. For example, plural lenses or concave axicon lenses are disposed on other thin films. In some other embodiments, the stereo display device 100 may include other transparent cover plates (not shown) as the surface of the table TAB. The transparent cover plates protect the concave axicon lens array 130 and the lens array 120, and the users may observe the concave axicon lens array 130 through the transparent cover plates. For example, the transparent cover plates may be made of glass.

In some embodiments, referring to FIG. 1, the lens stack ST of the stereo display device 100 may further include a first fresnel lens 150 and a second fresnel lens 160. The first fresnel lens 150 is disposed between the projectors 110 and the lens array 120. The first fresnel lens 150 is configured to turn the lights coming from respective projectors 110 to normal incident lights, which is then transmitted to the lens array 120 and the concave axicon lens array 130. The second fresnel lens 160 is disposed at a side of the concave axicon lens array 130 opposite to the lens array 120, and configured to help send the lights from the concave axicon lens array 130 to the viewing regions R. It is noted that, the first fresnel lens 150 and the second fresnel lens 160 are not necessary configurations, and in some embodiments, the first fresnel lens 150, the second fresnel lens 160, or both of them, may be omitted.

Figure 8:
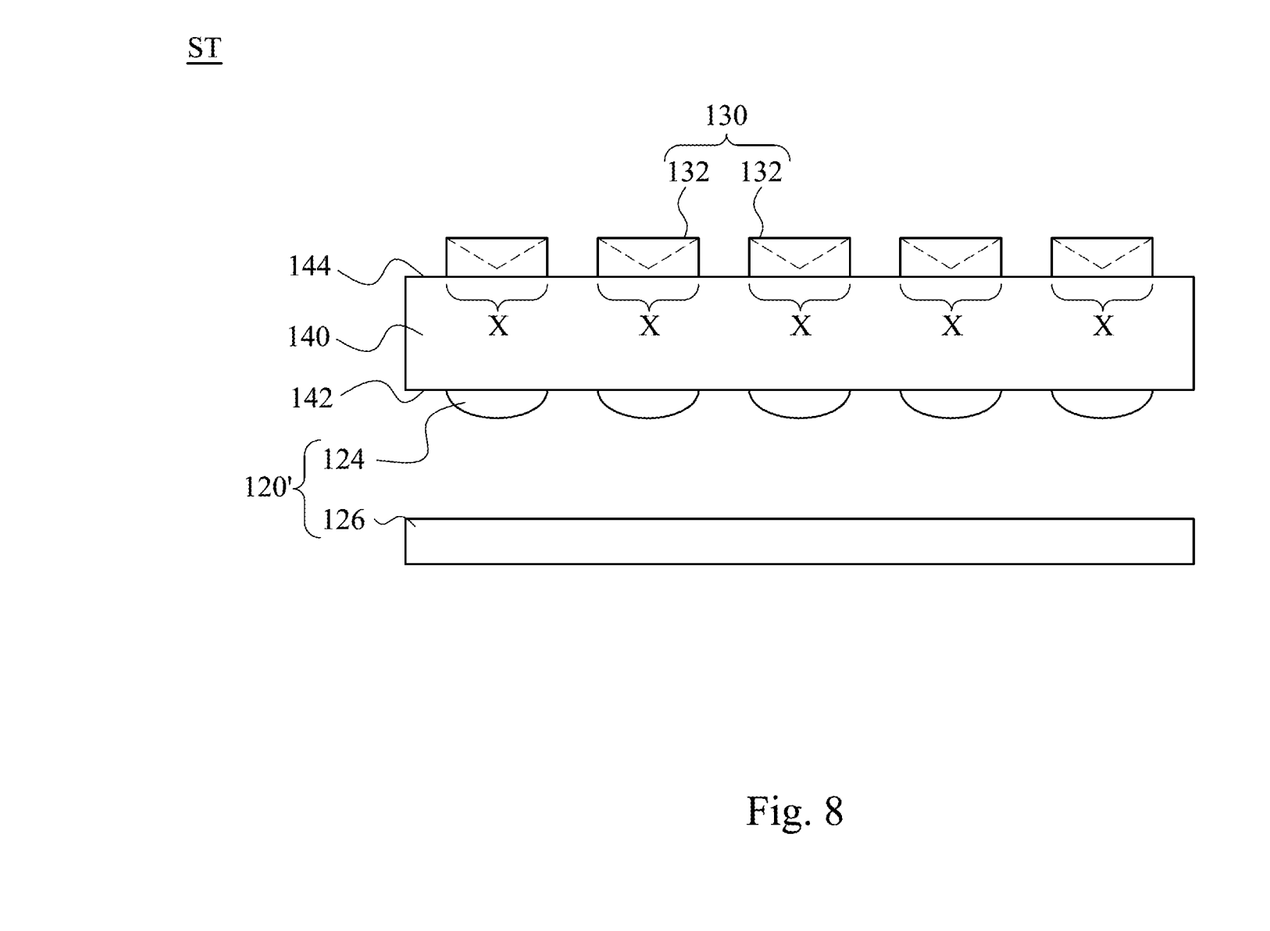
FIG. 8 is a side view of a portion of a lens stack of the stereo display device according to another embodiment of this invention.

FIG. 8 is a side view of a portion of a lens stack of the stereo display device according to another embodiment of this invention. The present embodiment is similar to the embodiment of FIG. 2, and the difference between the present embodiment and the embodiment of FIG. 2 is that: in the present embodiment, the lens array 120' includes a first lenticular lens 124 and a second lenticular lens 126. A lens power of a lenticular lens in one direction is better than a lens power of the lenticular lens in another direction. For example, a lenticular lens has a lens power in only one direction but have no lens power in an extension direction, and the extension direction is substantially orthogonal to the direction where the lens power shows. Herein an extension direction of the first lenticular lens 124 is substantially perpendicular to an extension direction of the second lenticular lens 126. Combining the first lenticular lens 124 and the second lenticular lens 126 may form a structure having the lens power in two dimensions.

In some embodiments of the present invention, a projection of the first lenticular lens 124 and a projection of the second lenticular lens 126 on a plane where the concave axicon lens array located (i. e. the surface 144 of the substrate 140) form plural intersection positions X, the concave axicon lens array 130 includes plural axicon lenses 132, and a center of each of the axicon lenses 132 is substantially aligned with a center of each of the intersection positions X. Through the configuration, lights passing through the intersection positions X substantially pass the axicon lenses 132, and therefore the lights may be affected by the lens power of first lenticular lens 124, the second lenticular lens 126, and the axicon lenses 132.

Herein, the substrate 140 is disposed between the first lenticular lens 124 and the concave axicon lens array 130. In some embodiments, the first lenticular lens 124 and the concave axicon lens array 130 are directly disposed on two opposite surfaces 142 and 144 of the substrate 140 respectively. Through the configuration, the structural strength is enhanced, and the fabrication steps of the first lenticular lens 124 and the concave axicon lens array 130 are integrated. Alternatively, in some other embodiments, additional substrate may be configured such that the first lenticular lens 124 and the second lenticular lens 126 are formed on two opposite surfaces of the additional substrate.

The embodiments of the present invention provide a stereo display device. Through the configuration of the concave axicon lens array, images are projected to plural viewing regions. For the viewing regions, the concave axicon lens array can provide a lens power in a horizontal direction and a diffusing effect in a vertical direction.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A stereo display device, comprising:
a plurality of projectors configured to project a plurality of different images to a plurality of viewing regions at an image side;
a lens array disposed between the projectors and the image side; and
a concave axicon lens array disposed between the lens array and the image side.

2. The stereo display device of claim 1, further comprising a substrate disposed between the lens array and the concave axicon lens array, wherein the lens array and the concave axicon lens array are directly disposed on two opposite surfaces of the substrate respectively.

3. The stereo display device of claim 1, wherein the lens array comprises a plurality of lenses, the concave axicon lens array comprises a plurality of axicon lenses, and a center of each of the lenses is substantially aligned with a center of each of the axicon lenses.

4. The stereo display device of claim 3, wherein each of the axicon lenses comprises:
a plane surface proximate to the lens array; and
a concave conical surface disposed opposite to the plane surface.

5. The stereo display device of claim 1, wherein the lens array comprises:
a first lenticular lens; and
a second lenticular lens, wherein an extension direction of the first lenticular lens is substantially perpendicular to an extension direction of the second lenticular lens.

6. The stereo display device of claim 5, further comprising a substrate disposed between the first lenticular lens and the concave axicon lens array, wherein the first lenticular lens and the concave axicon lens array are directly disposed on two opposite surfaces of the substrate respectively.

7. The stereo display device of claim 5, wherein a projection of the first lenticular lens and a projection of the second lenticular lens on a plane where the concave axicon lens array located form a plurality of intersection positions, the concave axicon lens array comprises a plurality of axicon lenses, and a center of each of the axicon lenses is substantially aligned with a center of each of the intersection positions.

8. The stereo display device of claim 1, further comprising a substrate disposed between the lens array and the concave axicon lens array, wherein the concave axicon lens array comprises a plurality of axicon lenses, and the axicon lenses are disposed on the substrate uniformly.

9. The stereo display device of claim 1, wherein the lens array is confocal with the concave axicon lens array.

10. The stereo display device of claim 9, wherein the lens array comprises at least one lens, the concave axicon lens array comprises at least one axicon lens, and a focal point of the lens is substantially located on a focal line of the axicon lens.

11. The stereo display device of claim 10, wherein a focal length of the lens array is greater than a focal length of the concave axicon lens array.

12. The stereo display device of claim 1, further comprising a first fresnel lens disposed between the projectors and the lens array.

13. The stereo display device of claim 12, further comprising a second fresnel lens disposed at a side of the concave axicon lens array opposite to the lens array.

14. The stereo display device of claim 1, wherein the projectors are arranged on a first plane, the lens array is disposed on a second plane, and the first plane is substantially parallel with the second plane.

15. The stereo display device of claim 1, further comprising a table, wherein the projectors, the lens array, and the concave axicon lens array are disposed in the table, and the projectors are respectively configured to project the images to the viewing regions out of the table through a surface of the table.

* * * * *